US011472261B2

(12) United States Patent
Benouali

(10) Patent No.: US 11,472,261 B2
(45) Date of Patent: Oct. 18, 2022

(54) VEHICLE HEAT TREATMENT SYSTEM

(71) Applicant: Valeo Systemes Thermiques, Le Mesnil-Saint-Denis (FR)

(72) Inventor: Jugurtha Benouali, Le Mesnil Saint Denis (FR)

( * ) Notice: Subject to any disclaimer, the term of this patent is extended or adjusted under 35 U.S.C. 154(b) by 0 days.

(21) Appl. No.: 17/058,034

(22) PCT Filed: Jun. 18, 2019

(86) PCT No.: PCT/FR2019/051481
§ 371 (c)(1),
(2) Date: Nov. 23, 2020

(87) PCT Pub. No.: WO2019/243726
PCT Pub. Date: Dec. 26, 2019

(65) Prior Publication Data
US 2021/0197650 A1 Jul. 1, 2021

(30) Foreign Application Priority Data
Jun. 18, 2018 (FR) ...................................... 1855307

(51) Int. Cl.
*B60H 1/00* (2006.01)
*B60H 1/32* (2006.01)
(Continued)

(52) U.S. Cl.
CPC ..... *B60H 1/00921* (2013.01); *B60H 1/00271* (2013.01); *B60H 1/00914* (2013.01);
(Continued)

(58) Field of Classification Search
CPC ............ B60H 1/32281; B60H 1/00271; B60H 1/00914; B60H 1/00921;
(Continued)

(56) References Cited

U.S. PATENT DOCUMENTS 9,855,815 B2 * 1/2018 Saab .................. B60H 1/00385
2015/0034272 A1 * 2/2015 Saab .................... B60H 1/2215
165/43
(Continued)

FOREIGN PATENT DOCUMENTS

DE 102013206626 A1 10/2014
DE 102015218825 A1 3/2017
(Continued)

OTHER PUBLICATIONS

English translation of FR-3028016-A1, obtained from ESPACENET. COM (Year: 2016).*
(Continued)

*Primary Examiner* — Miguel A Diaz
(74) *Attorney, Agent, or Firm* — Osha Bergman Watanabe & Burton LLP

(57) ABSTRACT

The invention relates to a heat treatment system (1) for a vehicle, comprising a coolant circuit (2) and a heat transfer fluid loop (3), the heat transfer fluid loop (3) comprising at least one heat exchanger (12, 35) configured to dissipate heat in an air flow (18, 19), the coolant circuit (2) comprising, in this order and according to a direction of circulation of the coolant in the coolant circuit (2), at least one compression device (4), a first heat exchanger (5) which thermally couples the heat transfer fluid loop (3) with the coolant circuit (2), a device (6) for accumulation of the coolant, a first passage (8) of an internal heat exchanger (7), an expansion member (9), a second heat exchanger (10) arranged in order to be passed through by an air flow (19) external to a passenger compartment of the vehicle and a second passage (11) of the internal heat exchanger (7).

10 Claims, 10 Drawing Sheets

Figure 1:
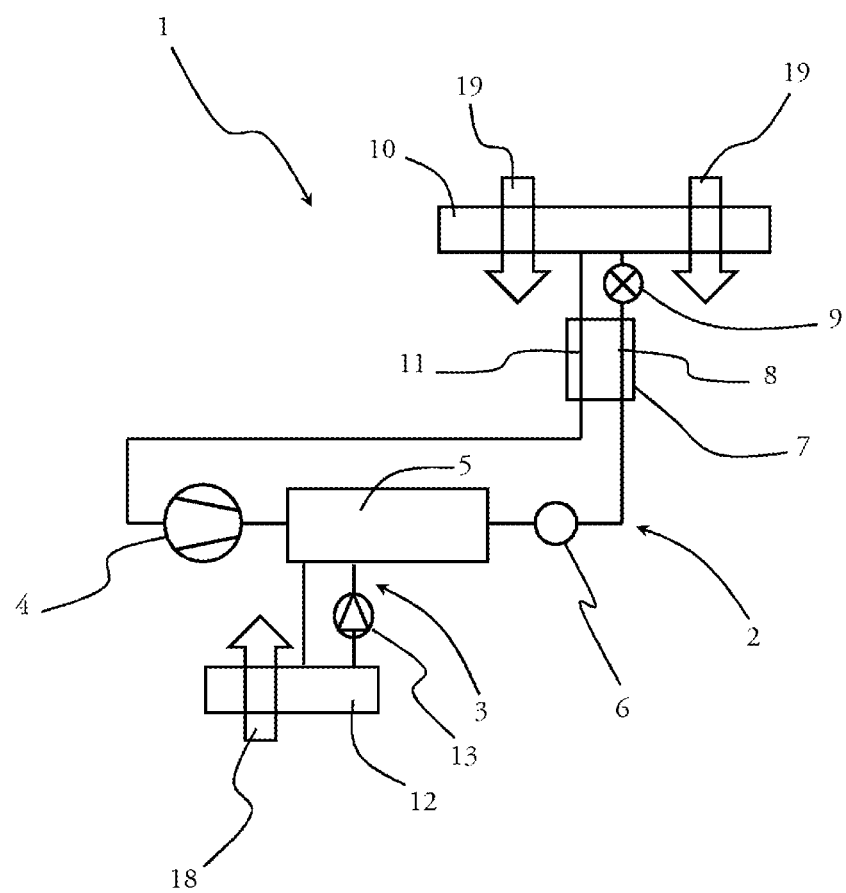

(51) Int. Cl.
  *F25B 41/20* (2021.01)
  *F25B 5/02* (2006.01)
  *F25B 49/02* (2006.01)
  *F25B 41/24* (2021.01)
  *F25B 40/02* (2006.01)
(52) U.S. Cl.
  CPC ........... *B60H 1/32281* (2019.05); *F25B 5/02* (2013.01); *F25B 40/02* (2013.01); *F25B 41/20* (2021.01); *F25B 41/24* (2021.01); *F25B 49/02* (2013.01); *B60H 2001/00307* (2013.01); *B60H 2001/00928* (2013.01); *B60H 2001/00949* (2013.01); *B60H 2001/00957* (2013.01); *F25B 2339/047* (2013.01); *F25B 2600/2519* (2013.01)
(58) Field of Classification Search
  CPC ........... B60H 2001/00307; B60H 2001/00928; B60H 2001/00949; B60H 2001/00957; F25B 41/20; F25B 5/02; F25B 40/02; F25B 43/006; F25B 49/02; F25B 2339/047; F25B 2339/044; F25B 2400/16; F25B 2600/2519
  See application file for complete search history.

(56) References Cited

U.S. PATENT DOCUMENTS

| | | | |
|---|---|---|---|
| 2017/0182864 A1* | 6/2017 | Heyl | B60H 1/00907 |
| 2018/0134123 A1* | 5/2018 | Herbolzheimer | B60H 1/3216 |
| 2021/0116153 A1* | 4/2021 | Dong | F25B 13/00 |
| 2021/0268870 A1* | 9/2021 | Dong | F25B 49/02 |

FOREIGN PATENT DOCUMENTS

| | | | | |
|---|---|---|---|---|
| DE | 102016004999 B3 | | 8/2017 | |
| FR | 2995669 A1 | * | 3/2014 | ............. F25B 27/02 |
| FR | 3028016 A1 | | 5/2016 | |
| WO | 2014040854 A1 | | 3/2014 | |

OTHER PUBLICATIONS

International Search Report and Written Opinion in corresponding International Application No. PCT/FR2019/051481, dated Oct. 14, 2019 (13 pages).

* cited by examiner

VEHICLE HEAT TREATMENT SYSTEM

The field of the present invention is that of thermal management systems used for heating or cooling a space or a component of a vehicle, notably for a motor vehicle.

Motor vehicles are currently equipped with a refrigerant circuit used to heat or cool various zones or various components of the vehicle. It is particularly known for this refrigerant circuit to be used to thermally manage an air flow sent into the interior of the vehicle cabin equipped with such a circuit.

In another application of this circuit, it is known for it to be used to cool an electrical-energy storage device of the vehicle, said device being used to provide energy to an electric motor capable of moving the vehicle. The refrigerant circuit thus provides the energy capable of cooling the electrical-energy storage device when it is used during running phases.

The refrigerant circuit known to date and capable of performing a function of heating the vehicle cabin interior, a function of cooling the vehicle cabin interior, a function of recovering energy and a function of thermal management of a vehicle electrical-energy storage device, something which is complex and calls for numerous parts.

By way of example, this known refrigerant circuit uses numerous valves and at least one accumulator positioned immediately upstream of the compression device. Now, the use of these valves entails a particularly complicated routing of the circuit, and this constitutes a first disadvantage of the known circuit.

A second disadvantage lies in the use of the accumulator. Specifically, this component is particularly bulky, which makes it more complicated to install on the vehicle and is disadvantageous to the cost of the refrigerant circuit. Furthermore, the use of an accumulator prevents it from being possible to reach a compromise on performance between the four above-mentioned modes of operation.

The invention falls within this context and proposes a technical solution which comprises a restricted number of parts and restrained routing of the circuit, and the bulkiness following installation in the vehicle and cost of manufacture of which are under control, while at the same time offering the option of performing at least four functions included among which are the function of heating the vehicle cabin interior, the function of cooling the vehicle cabin interior, the function of recovering energy from a component in the electric powertrain of the vehicle and the function of thermal management of a component of the electric powertrain of the vehicle.

One subject of the invention is therefore a thermal management system for a vehicle, comprising a refrigerant circuit and a loop for heat-transfer liquid, the loop for heat-transfer liquid comprising at least one heat exchanger configured to dissipate heat energy into an air flow, the refrigerant circuit comprising, in this order and in a direction in which the refrigerant circulates in the refrigerant circuit, at least one compression device, a first heat exchanger which thermally couples the loop for heat-transfer liquid to the refrigerant circuit, a refrigerant accumulation device, a first pass of an internal heat exchanger, an expansion member, a second heat exchanger designed to have passing through it a flow of air external to an interior of the vehicle cabin and a second pass of the internal heat exchanger.

The refrigerant is, for example, a sub-critical fluid, as known under reference R134a or R1234yf. The refrigerant circuit according to the invention is a closed circuit which implements a thermodynamic cycle, particularly one involving compressing vapor.

The compression device is, for example, a compressor, and the invention is particularly applicable when the compressor is a fixed-displacement, variable-speed electric compressor. It is thus possible to control the thermal power of the refrigerant circuit.

The first heat exchanger forms a region for the exchange of heat between the refrigerant and the heat-transfer liquid. This is an exchanger which comprises a first compartment through which the refrigerant passes and a second compartment used by the heat-transfer liquid, the two compartments being organized in such a way that heat energy is transferred within them.

The accumulation device is advantageously a bottle, notably of desiccant.

According to the invention, the elements of the refrigerant circuit are positioned one after the other, and in a precise order. It is this arrangement which, depending on the envisioned mode of operation, makes it possible to achieve first-rate thermal performance, at low cost.

Advantageously, the expansion member is configured to adopt at least one position that is inoperative with respect to the refrigerant. This position corresponds to modes of operation in which it is necessary to cool an interior air flow sent into the vehicle cabin interior, or else when it is necessary to cool a component of the electric powertrain of the vehicle. By contrast, the expansion member generates a drop in pressure head in a mode such as the heat-pump mode.

Advantageously, the refrigerant circuit comprises a main leg and at least a first leg parallel to the main leg, this main leg comprising at least the compression device, the first heat exchanger, the refrigerant accumulation device, the first pass of the internal heat exchanger, the expansion member, the second heat exchanger and the second pass of the internal heat exchanger, whereas the first leg comprises at least a first expansion device and a third heat exchanger designed to have passing through it an interior air flow sent into the interior of the vehicle cabin. The fluid can also circulate in succession at least through the main leg then through the first leg, according to the modes of operation detailed later on. This first leg is thus dedicated to the cooling of the air flow sent into the vehicle cabin interior.

Advantageously, it will be noted that the refrigerant circuit comprises at least a second leg parallel to the main leg, the second leg comprising a second expansion device and a fourth heat exchanger designed to cool an additional fluid. This second leg is thus dedicated to the cooling of a component of the electric powertrain of the vehicle, for example its propulsion motor, its electrical-energy storage device or its power electronics module.

Advantageously, the main leg comprises at least a main valve configured to shut off a circulation of refrigerant in the main leg.

According to another embodiment example, the refrigerant circuit comprises at least a three-way valve positioned at a point of separation of the main leg and piping positioned in parallel with the main leg.

Advantageously, the first expansion device and/or the second expansion device which were mentioned hereinabove are configured to adopt at least a position that prevents any circulation of refrigerant toward the third heat exchanger or toward the fourth heat exchanger, respectively. Each leg thus comprises a heat exchanger positioned downstream of an expansion device, so that the third heat exchanger and/or the fourth heat exchanger operates as an evaporator.

According to one advantageous embodiment, the internal heat exchanger of the main leg is a main internal heat exchanger, the refrigerant circuit comprising a secondary internal heat exchanger common to the first leg and to the second leg.

According to another example, the internal heat exchanger of the main leg is a main internal heat exchanger and the first leg comprises a first internal heat exchanger. In such a case, the first internal heat exchanger is active only with respect to the refrigerant which is sent toward the third heat exchanger.

According to another example, which is an alternative to the preceding paragraph, the heat exchanger of the main leg is a main internal heat exchanger and the second leg comprises a second internal heat exchanger. In such a case, the second internal heat exchanger is active only with respect to the refrigerant which is sent toward the fourth heat exchanger.

Of course, the invention covers the instance in which the refrigerant circuit comprises the main circuit, the first leg and the second leg each being equipped with a distinct internal heat exchanger, referred to as the first internal heat exchanger when assigned to the first leg, and second internal heat exchanger when assigned to the second leg.

According to one optional aspect of the invention, the main leg comprises a secondary valve configured to shut off a circulation of refrigerant in the main leg, the secondary valve being positioned between the second heat exchanger and the second pass of the internal heat exchanger. Such a secondary valve adopts a closed position in the mode for cooling the vehicle cabin interior or for cooling the component of the electric powertrain, and an open position in heat-pump mode.

According to one particular embodiment example, the refrigerant circuit comprises a pipe which bypasses the first pass of the internal heat exchanger, the expansion member, the second heat exchanger and the second pass of the internal heat exchanger, the pipe comprising at least a fifth heat exchanger designed to have passing through it the flow of air external to the interior of the vehicle cabin. This pipe is used for reducing drops in pressure head in certain modes of operation.

In this example, the refrigerant circuit may comprise a second valve positioned in the pipe and configured to shut off a circulation of refrigerant in the pipe.

Advantageously, the first leg is connected to the main leg at a point, referred to as the first connection point, comprised between the second heat exchanger and the internal heat exchanger. The first leg is also connected to another point, referred to as the third connection point, at which the first leg connects to the main leg.

Thanks to the arrangement of the first leg, the second heat exchanger can act as an evaporator in heat-pump mode in collaboration with the first heat exchanger which itself acts as a condenser. Still by virtue of this arrangement, the second heat exchanger can also act as a supercooling heat exchanger, both in conditioning mode in collaboration with the third heat exchanger and in battery-cooling mode in collaboration with the fourth heat exchanger. Thus, according to the invention, the one same single exchanger, the second heat exchanger, can perform all of these functions whereas, in the systems according to the prior art, at least two distinct exchangers are required in order to perform said functions.

Advantageously, the first leg comprises at least one pass of the internal heat exchanger, notably of the internal heat exchanger common to the first leg and to the second leg.

Advantageously, the heat exchanger of the loop for heat-transfer liquid is a radiator designed to have passing through it the flow of air external to the interior of the vehicle cabin.

Alternatively, the heat exchanger of the loop for heat-transfer liquid is a unit heater designed to have passing through it the flow of interior air sent into the interior of the vehicle cabin.

The invention of course covers a combination of these means, in which the loop for heat-transfer liquid comprises a first heat exchanger designed to have passing through it the flow of air external to the interior of the vehicle cabin, as well as a second heat exchanger designed to have passing through it the flow of interior air sent into the interior of the vehicle cabin. In such an instance, the first heat exchanger is a radiator, whereas the second heat exchanger is a unit heater.

Figure 2:
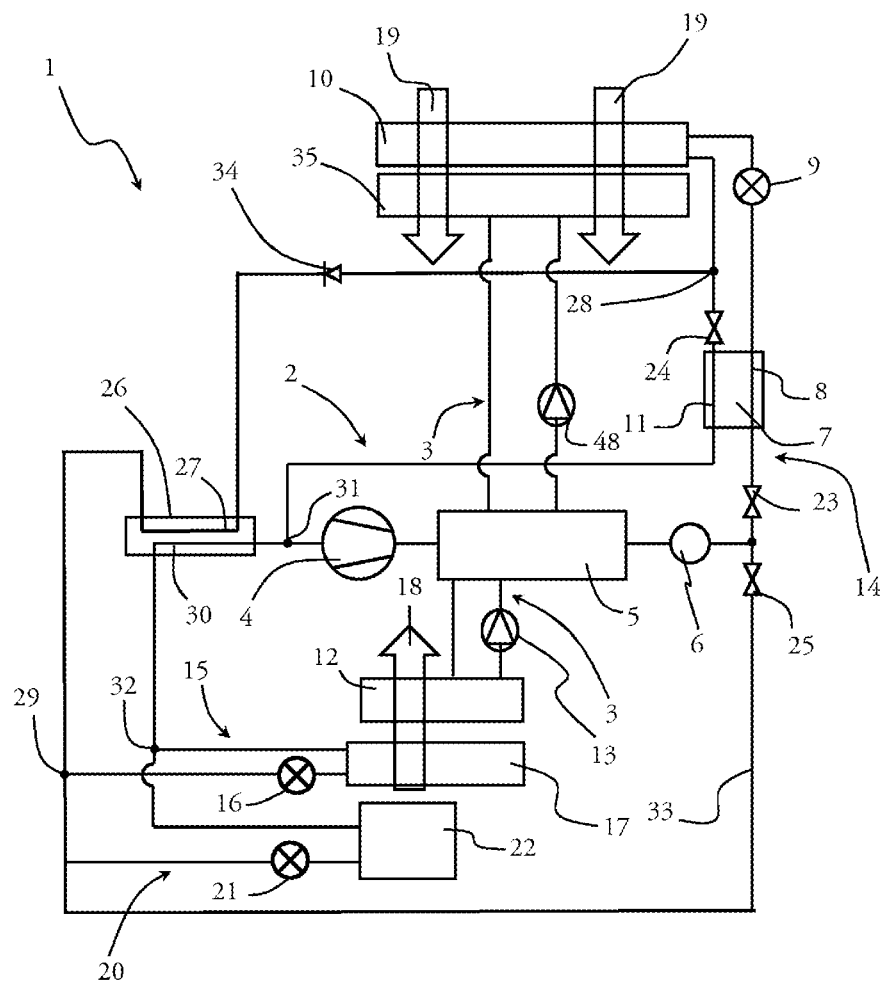
Figure 3:
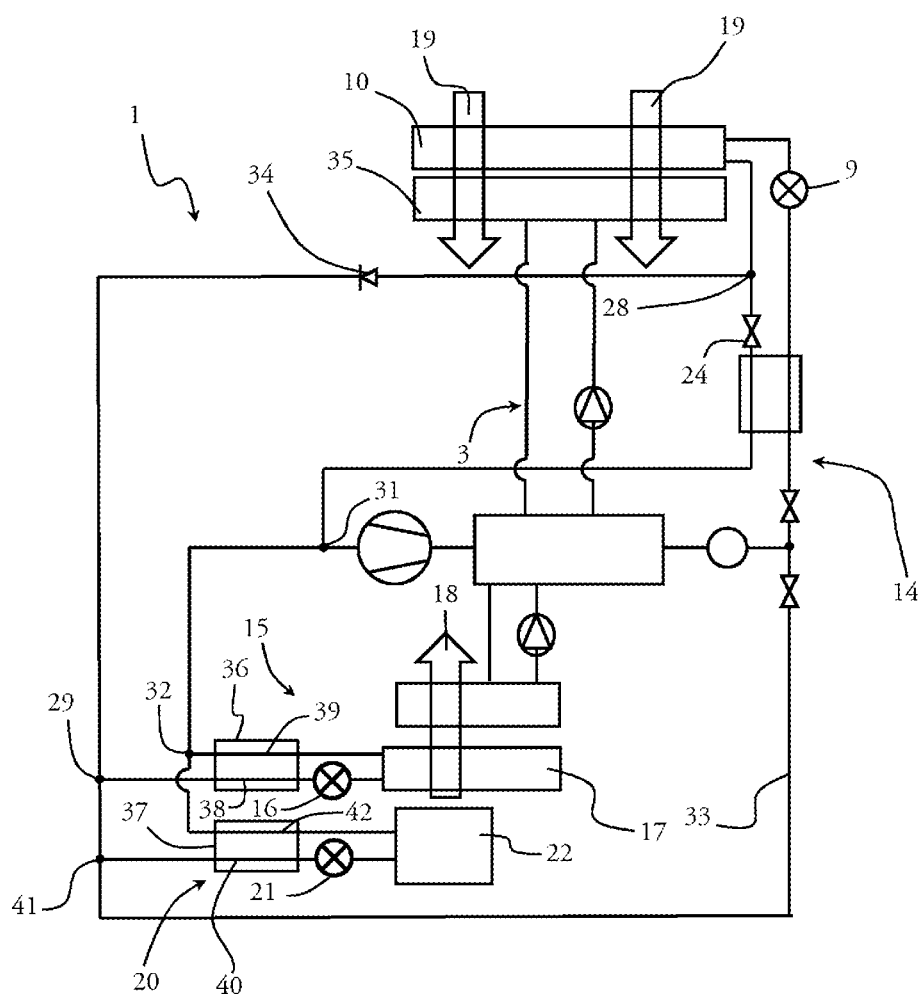
Figure 4:
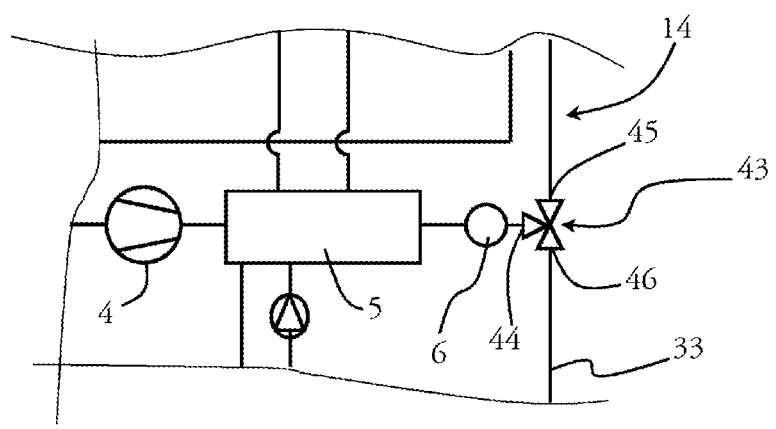
Figure 5:
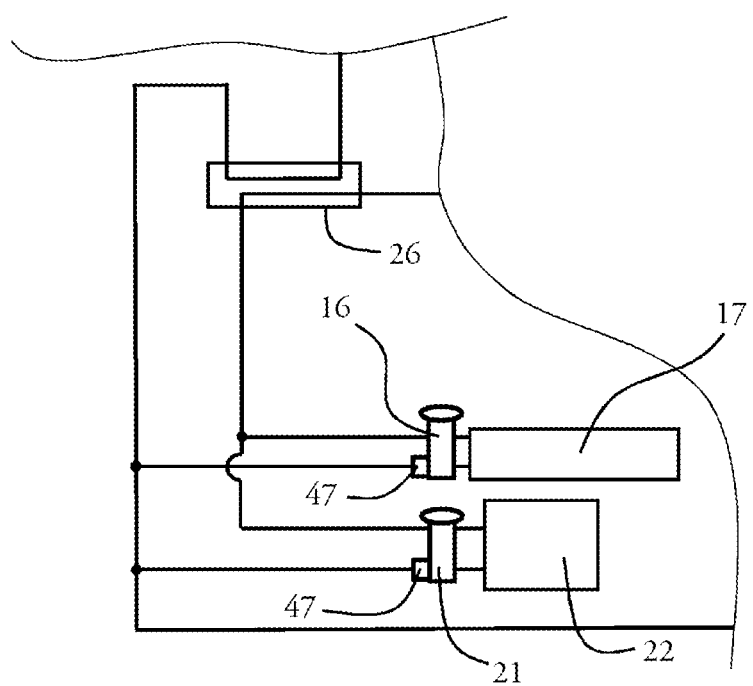
Figure 9:
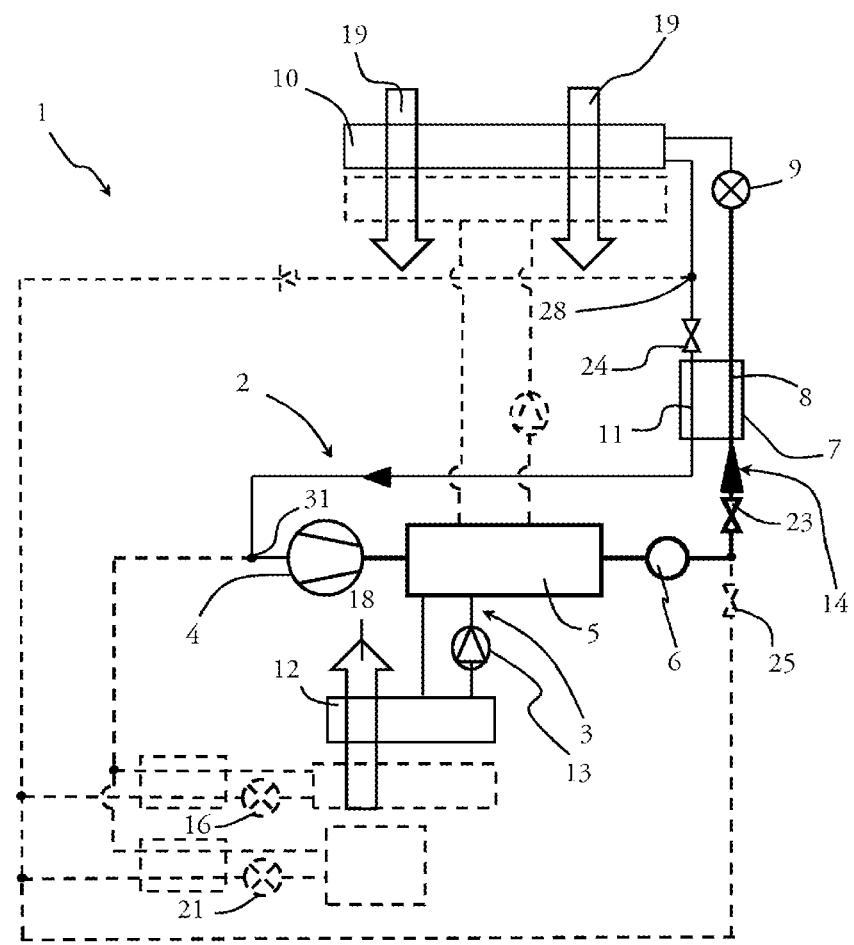
Figure 10:
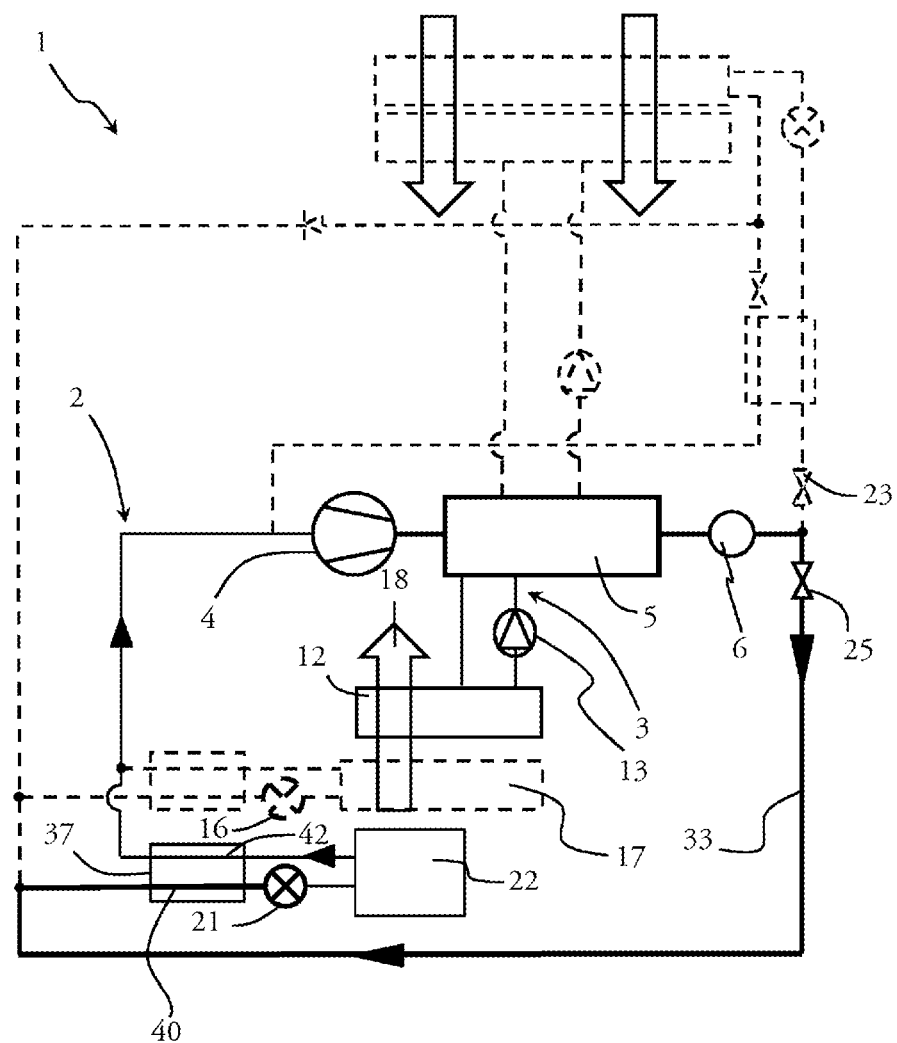
Figure 11:
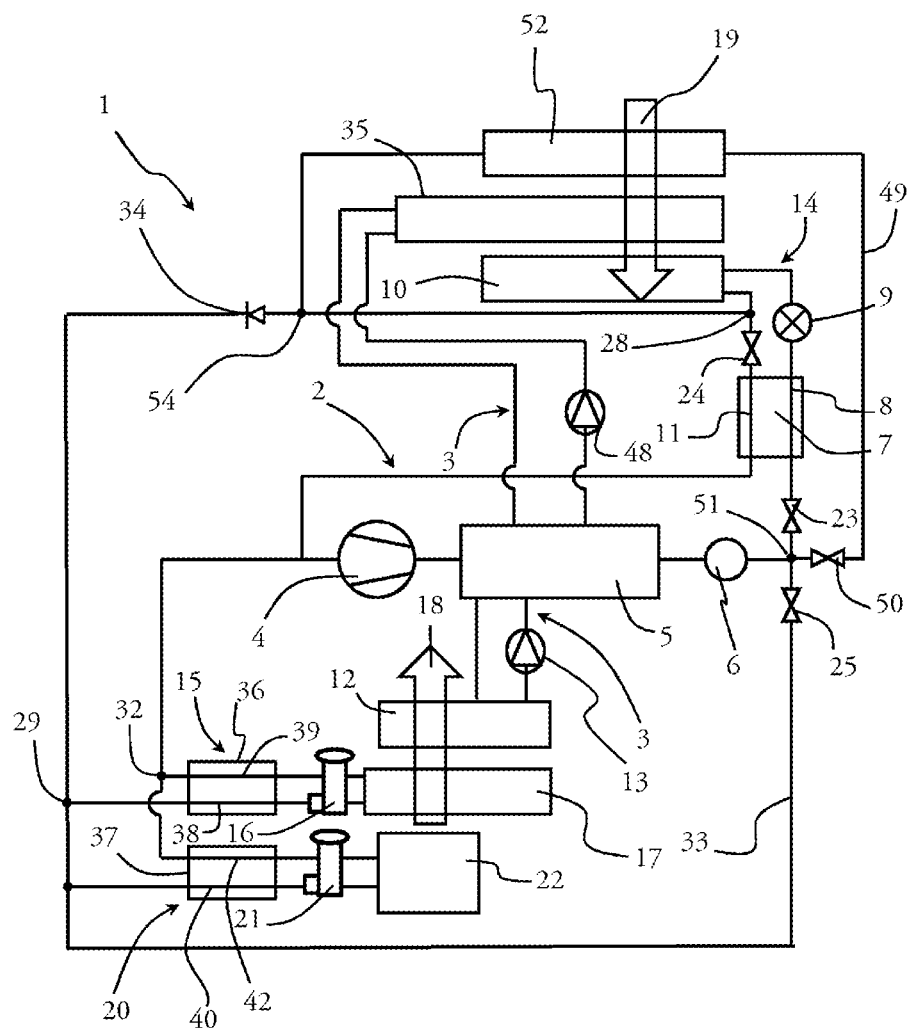

Further features, details and advantages of the invention will become more clearly apparent from reading the following description, which is provided by way of illustration and with reference to drawings in which:

FIG. 1 is a schematic view of a thermal management system according to the invention, in a first embodiment, FIG. 2 is a schematic view of the thermal management system, in a second embodiment, FIG. 3 is a schematic view of the thermal management system, in a third embodiment, FIGS. 4 to 5 illustrate embodiment variants that may be applied to the thermal management systems of FIG. 1, 2, 3 or 11, FIGS. 6 to 10 show the thermal management system that forms the subject matter of FIG. 3, operated according to various modes of operation, FIG. 11 illustrates a fourth embodiment of the thermal management system that forms the subject matter of the invention.

It should first of all be noted that the figures set out the invention in a detailed manner in order to implement the invention, it being, of course, possible for said figures to serve to better define the invention if necessary. These figures are schematic representations which illustrate how the thermal management system is produced, its composition, and how the fluids circulate within it. In particular, the thermal management system comprises, on the one hand, a refrigerant circuit and a loop for heat-transfer liquid, a heat exchanger having these two fluids passing through it.

The refrigerant circuit chiefly comprises a device for compressing the refrigerant, heat exchangers, expansion members, piping connecting each of these components, and valves or shutters. The circuit may also be placed under the dependency of a controller which acts on certain of these components.

The terms upstream and downstream used in the following description refer to the direction of circulation of the fluid in question, that is to say the refrigerant, the heat-transfer liquid, an interior air flow sent to an interior of the vehicle cabin or a flow of air external to this interior of the vehicle cabin.

In FIGS. 6 to 10, the refrigerant is symbolized by an arrow which illustrates the direction of circulation of the latter in the piping in question. The solid lines illustrate a portion of the circuit where the refrigerant circulates, whereas the broken lines show an absence of circulation of the refrigerant. The thick lines illustrate the refrigerant in a state of high pressure and high temperature, whereas the thin lines illustrate this refrigerant in a state of low pressure and low temperature.

FIG. 1 thus shows a thermal management system 1 which comprises a refrigerant circuit 2 inside which a refrigerant circulates, as well as a loop 3 for heat-transfer liquid, in which loop a heat-transfer liquid moves.

This refrigerant circuit 2 is a closed loop in which the refrigerant is made to circulate by a compression device 4. It will be noted that this compression device 4 can take the form of an electric compressor, that is to say a compressor which comprises a compression mechanism, an electric motor and possibly a controller. The rotation mechanism is rotated by the electric motor, the speed of rotation of which is controlled by the controller, which can be external or internal to the compression device concerned.

According to the first embodiment depicted in FIG. 1, the refrigerant circuit 2 comprises, in this order and according to the direction in which the refrigerant circulates within it, at least the compression device 4 connected by piping to a first heat exchanger 5 which thermally couples the loop 3 for heat-transfer liquid to the refrigerant circuit 2. This first heat exchanger 5 is connected by piping to a refrigerant accumulation device 6. This accumulation device 6 is thus positioned immediately downstream of the first heat exchanger 5 and may for example adopt the form of a bottle of desiccant.

This accumulation device 6 is connected directly to an internal heat exchanger 7, particularly to a first pass 8 of this internal heat exchanger 7. This first pass 8 of the internal heat exchanger 7 is connected directly by piping to an expansion member 9, such a member having at least two functions: a first aimed at generating a drop in pressure head in order to effect an expansion of the refrigerant and a second in which the expansion member 9 is inoperative, namely allows fluid to pass without generating a drop in pressure head.

The expansion member 9 is connected directly via piping to a second heat exchanger 10 designed to have passing through it a flow 19 of air external to an interior of the vehicle cabin. In practice, such a second heat exchanger 10 is positioned for example on the front face of the vehicle, so as to be exposed to the flow of exterior air generated by the movement of the vehicle and/or by the activation of a motorized fan unit situated on the front face of the vehicle.

The second heat exchanger 10 is connected directly via piping to the internal heat exchanger 7, notably to a second pass 11 of the internal heat exchanger 7. The refrigerant circulating in the first pass 8 exchanges heat energy with the refrigerant circulating in the second pass 11.

This second pass 11 is connected directly via piping to the compression device 4, in which the thermodynamic cycle can be performed once again.

The loop 3 for heat-transfer liquid comprises, for its part, the first heat exchanger 5 which is connected by piping to at least one heat exchanger 12 configured to dissipate heat energy into a flow of air. The loop 3 for heat-transfer liquid also comprises at least a pump 13 which displaces the heat-transfer liquid in such a way that the latter circulates through the first heat exchanger 5 and through the heat exchanger 12.

The first heat exchanger 5 is a refrigerant/heat-transfer liquid heat exchanger in which a transfer of heat energy can be performed between one of these fluids and the other.

FIG. 2 illustrates the thermal management system in a second embodiment, the latter making use of the thermal management system 1 as described in FIG. 1. Thus, reference may be made to the description of FIG. 1 for the operation thereof, the additional components being detailed hereinafter.

The components listed in the description of FIG. 1 are grouped together in a main leg 14 of the refrigerant circuit 1. Thus, the main leg 14 comprises the compression device 4, the first heat exchanger 5, the refrigerant accumulation device 6, the first pass 8 of the internal heat exchanger 7, the expansion member 9, the second heat exchanger 10 and the second pass 11 of the internal heat exchanger 7.

The refrigerant circuit 2 according to the second embodiment comprises a first leg 15 which is arranged at least in part in parallel with the main leg 14 from a fluidic standpoint. This first leg 15 notably comprises at least a first expansion device 16 and a third heat exchanger 17 designed to have passing through it a flow 18 of interior air sent into the interior of the vehicle cabin.

The first leg 15 is connected to the main leg 14 at a first connection point 28 positioned between an outlet of the second heat exchanger 10 and an inlet of the second pass 11 of the internal heat exchanger 7 which forms part of the main leg 14. The first leg 15 is also connected to a third connection point 31 situated on the main leg 14 between an outlet of the second pass 11 of the internal heat exchanger 7 of the main leg 14 and an inlet of the compression device 4.

Thanks to the arrangement of the first leg 15, the second heat exchanger 10 can act as an evaporator in heat-pump mode in collaboration with the first heat exchanger 5 which itself acts as a condenser. Still by virtue of this arrangement, the second heat exchanger 10 can also act as a supercooling heat exchanger, both in conditioning mode in collaboration with the third heat exchanger 17 and in battery-cooling mode in collaboration with the fourth heat exchanger 22. Thus, according to the invention, the one same single exchanger, the second heat exchanger 10, can perform all of these functions whereas, in the systems according to the prior art, at least two distinct exchangers are required in order to perform said functions.

Such a layout of the first leg 15, which bypasses the second pass 11 of the internal heat exchanger 7 of the main leg 14, avoids the refrigerant circulating in the second pass 11 of the internal heat exchanger 7 in the cooling modes of operation. This then limits drops in pressure head.

As illustrated in the embodiment of FIG. 2, the first leg 15 may comprise a secondary internal heat exchanger 26 dedicated to the refrigerant circulating at least in the first leg 15.

According to this embodiment example, the first expansion device 16 is an electronically controlled expansion valve which comprises at least a function of completely shutting off the circulation of refrigerant through it. Thus, the first expansion device 16 according to the invention is configured to adopt at least a position in which it blocks any circulation of refrigerant toward the third heat exchanger 17 and positions in which it generates a drop in pressure head in the refrigerant. It will be noted that this third heat exchanger 17 is used as an evaporator to cool the flow of interior air 18 which is sent into the interior of the vehicle cabin.

The refrigerant circuit 2 illustrated in FIG. 2 also comprises a second leg 20 which is parallel to at least part of the first leg 15, from a fluidic standpoint. More specifically, the second leg 20 is in parallel with the first expansion device 16 and with the third heat exchanger 17. This second leg 20 is thus connected at a second connection point 29 and at a fourth connection point 32.

The layout and the constituent components of the second leg 20 are similar to those of the first leg 15. Thus, the second leg 20 comprises a second expansion device 21 and a fourth heat exchanger 22 which is designed to cool an additional fluid. As with the first expansion device 16, the second expansion device 21 is an electronically controlled expansion valve which comprises at least a function of completely shutting off the circulation of refrigerant through it. Thus, the second expansion device 21 according to the invention is configured to adopt at least a position in which it blocks any circulation of refrigerant toward the fourth heat exchanger 22 and positions in which it generates a drop in pressure head in the refrigerant heading toward this fourth heat exchanger 22. It will be noted that this fourth heat exchanger 22 is used as an evaporator to cool an additional fluid which is thermally coupled to at least one component of an electric powertrain of the vehicle, notably to the electrical-energy storage device.

The main leg 14 is completed by the addition of a main valve 23 and of a secondary valve 24. The main valve 23 is configured to shut off a circulation of refrigerant in the main leg 14 and is, for example, located on said leg between the accumulation device 6 and the first pass 8 of the internal heat exchanger 7. The secondary valve 24 for its part is positioned between the first connection point 28 and the second pass 11 of the internal heat exchanger 7.

FIG. 2 also shows piping 33 comprising a first valve 25 configured to shut off a circulation of refrigerant in this piping 33 arranged in parallel with the first leg 15.

By using this approach, this first valve 25 also interrupts the circulation of refrigerant in the second leg 20, this piping 33 being connected in such a way as to supply the first leg 15 and/or the second leg 20 with refrigerant.

In this embodiment illustrated in FIG. 2, the refrigerant circuit 2 comprises two internal heat exchangers 7, 26. The internal heat exchanger 7 which forms part of the main leg 14 is referred to hereinafter as: the main internal heat exchanger 7, by reference to its involvement in making up the main leg 14. In this configuration, the first leg 15 comprises a secondary internal heat exchanger 26 which performs an exchange of heat between two portions of a common part of the first leg 15 and of the second leg 20 of the refrigerant circuit 2.

This secondary internal heat exchanger 26 comprises a first pass 27 positioned in the first leg 15, between the first connection point 28 and the second connection point 29, and a second pass 30 formed between the third connection point 31 and the fourth connection point 32.

The first connection point 28 and the third connection point 31 are the points at which the first leg 15 divides from the main leg 14 to form a sub-circuit running at least in part in parallel with the main leg 14.

The second connection point 29 and the fourth connection point 32 are separation points at which the second leg 20 divides from the first leg 15 to run in parallel therewith.

It will therefore be appreciated that the secondary internal heat exchanger 26 is common to the first leg 15 and to the second leg 20 insofar as the refrigerant that passes through the first pass 27 of the secondary internal heat exchanger 26 divides into two quantities which each supply the first leg 15 and the second leg 20, this separation occurring after the first pass 27, at the second connection point 29.

A check valve 34 is arranged on the first leg 15 between the first connection point 28 and an inlet of the first pass 27 of the secondary internal heat exchanger 26. This check valve allows the refrigerant to circulate from the main leg 14 toward the first leg 15, and prevents any circulation of refrigerant in the opposite direction, namely from the first leg 15 toward the main leg 14.

The loop 3 for heat-transfer liquid here comprises two heat exchangers configured to dissipate heat energy into a flow of air, each of these heat exchangers being arranged in loop portions that are distinct and that run in parallel with one another, notably a first portion and a second portion of the loop for heat-transfer liquid. The first heat exchanger 12 thus has passing through it the heat-transfer liquid and the flow 18 of interior air sent into the vehicle cabin interior. This first heat exchanger 12 is a unit heater tasked with heating the vehicle cabin interior, in cold conditions.

The loop 3 for heat-transfer liquid comprises a loop portion in which there is a second heat exchanger 35, the latter being configured to dissipate heat energy into the flow 19 of air external to the vehicle cabin interior. In other words, this second heat exchanger 35 is placed on the front face of the vehicle, next to the second heat exchanger 10. The function of this second heat exchanger 35 is to discharge into the flow 19 of exterior air the heat energy derived from the first heat exchanger 5 and transported by the heat-transfer liquid. In this regard, the second heat exchanger 35 is a radiator.

The portion of the loop 3 for heat-transfer liquid that comprises the second heat exchanger 35 also comprises a circulating means 48 for circulating the heat-transfer liquid in this portion so that the heat-transfer liquid carries the heat energy picked up in the first heat exchanger 5 as far as the second heat exchanger 35 in order to discharge it into the flow 19 of exterior air.

FIG. 3 shows a third embodiment of the thermal management system 1 that forms the subject matter of the invention. The main leg 14, the loop 3 for heat-transfer liquid and the piping 33 are identical to those described in FIG. 1 or 2, and reference will be made to the description of this FIG. 2 which applies, mutatis mutandis, to FIG. 3.

This third embodiment comprises individual internal heat exchangers for the first leg 15 and for the second leg 20. The first leg 15 thus comprises a first internal heat exchanger 36, whereas the second leg 20 comprises a second internal heat exchanger 37 which is separate and distinct from the first internal heat exchanger 36.

The first internal heat exchanger 36 thus comprises a first pass 38 arranged in the path connecting the second connection point 29 to an inlet of the first expansion device 16. The first internal heat exchanger 36 also comprises a second pass 39 arranged between an outlet of the third heat exchanger 17 and the fourth connection point 32. It will therefore be appreciated that the exchange of heat that occurs in the first internal heat exchanger 36 is dedicated to the refrigerant supplying and coming from the third heat exchanger 17.

The second leg 20 comprises the second internal heat exchanger 37, and the latter comprises a first pass 40 arranged in the path connecting a fifth connection point 41 to an inlet of the second expansion device 21. The second internal heat exchanger 37 also comprises a second pass 42 arranged between an outlet of the fourth heat exchanger 22 and the fourth connection point 32. It will therefore be appreciated that the exchange of heat that occurs in the second internal heat exchanger 37 is dedicated to the refrigerant supplying and coming from the fourth heat exchanger 22.

FIG. 4 illustrates an embodiment variant that can be reapplied to either one of the second or third embodiment. The compression device 4 discharges the hot refrigerant into the first heat exchanger 5.

When this refrigerant has had its heat energy removed, it enters the accumulation device 6 carefully sited between an outlet of the first heat exchanger 5 and an inlet of the first pass of the main internal heat exchanger.

The main valve 23 and the first valve 25 are replaced here by a three-way valve 43 of which a first port 44 is connected to an outlet of the accumulation device 6, a second port 45 is connected to the first pass of the main heat exchanger and a third port 46 is connected to the piping 33.

FIG. 5 illustrates another embodiment variant that can be applied to either one of the second or third embodiments. In this particular instance, it is the secondary internal heat exchanger 26 that is illustrated in FIG. 5, but it will be appreciated that the modifications set out hereinbelow can be reapplied to the embodiment using the first internal heat exchanger and the second internal heat exchanger assigned to each of the first and second legs 15, 20.

In this variant, the first expansion device 16 and the second expansion device 21 are controlled-closure thermostatic expansion valves. In practice, it is a thermostatic expansion valve of which a bore section for incoming refrigerant is dependent on a temperature of this refrigerant at the outlet of the relevant heat exchanger. The controllable closure of this thermostatic expansion valve is performed by a shut-off valve 47 built into the thermostatic expansion valve and which is configured to adopt at least a position that prevents any circulation of refrigerant through the controlled-closure thermostatic expansion valve, notably toward the inlet of the third heat exchanger 17 or toward the inlet of the fourth heat exchanger 22.

Figure 6:
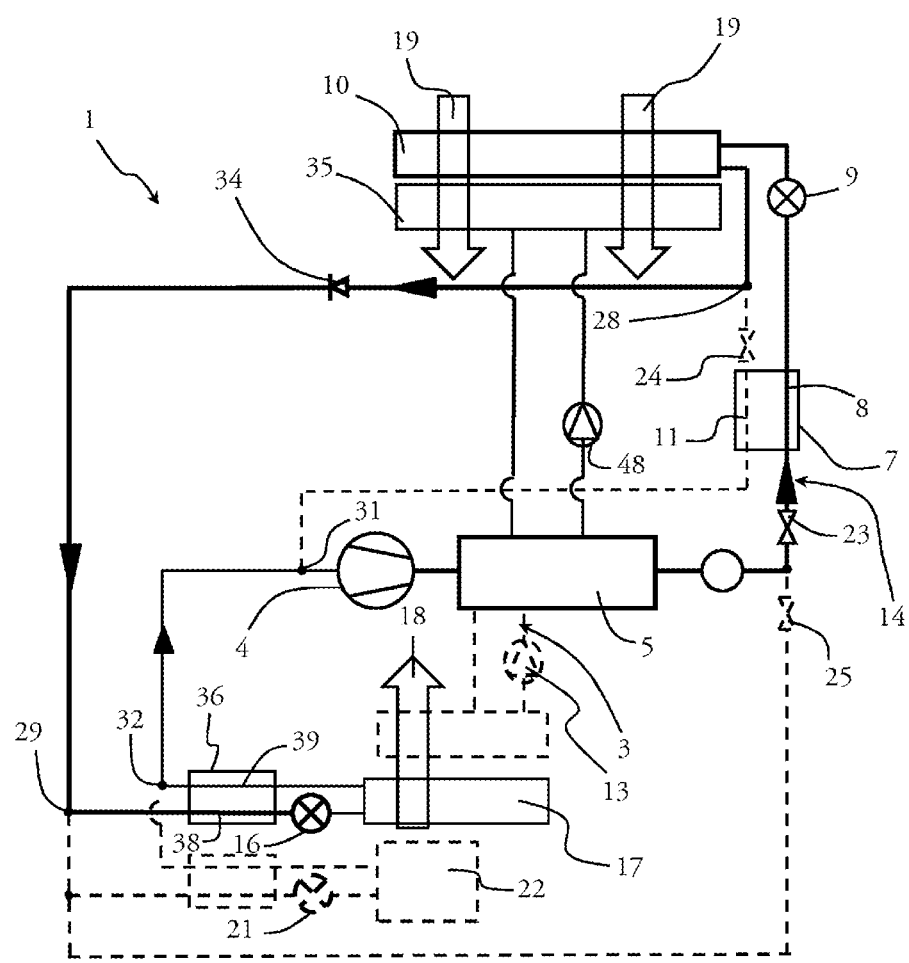

FIG. 6 considers by way of example the third embodiment. This figure illustrates a mode of operation corresponding to a cooling of the flow 18 of air sent into the vehicle cabin interior.

The compression device 4 raises the pressure and the temperature of the refrigerant. This hot refrigerant is cooled as it passes through the first heat exchanger 5. As it does so, the refrigerant condenses and leaves the first heat exchanger 5 in the liquid state, said exchanger then being a condenser. The refrigerant in the liquid state is stored in the accumulation device 6, and only its liquid fraction leaves this accumulation device 6 to head toward the main internal heat exchanger 7. This is made possible because the main valve 23 is in the open position whereas the first valve 25 is closed. The secondary valve 24 is also in the closed position.

The refrigerant in the liquid state passes through the first pass 8 of the main internal heat exchanger 7 and enters the expansion member 9. In this mode of operation, this expansion member 9 has no effect on the state of the refrigerant. It therefore allows fully unimpeded passage. The refrigerant circulates through the second heat exchanger 10 in the liquid state and experiences forced supercooling, namely a lowering of its temperature to below its condensation temperature. This forced supercooling is performed by virtue of the flow 19 of exterior air which passes through the second heat exchanger 10. On leaving the second heat exchanger 10, the refrigerant passes from the main leg 14 to the first leg 15 at the first connection point 28, then passes through the check valve 34.

The refrigerant in the liquid state then passes through the first pass 38 of the first internal heat exchanger 36 and arrives at the first expansion device 16, in which it experiences expansion. The refrigerant then vaporizes as it passes through the third heat exchanger 17, the latter having passing through it the flow 18 of interior air sent into the vehicle cabin interior. This is how the cooling of the vehicle cabin interior is brought about.

The refrigerant in the gaseous state then leaves the third heat exchanger 17 and passes through the second pass 39 of the first internal heat exchanger 36. There is a transfer of heat energy between the refrigerant in the liquid state which is present in the first pass 38 and the refrigerant in the gaseous state which is present in the second pass 39 of the first internal heat exchanger 36. The refrigerant which leaves the second pass 39 of the first internal heat exchanger 36 finally arrives at an inlet of the compression device 4 so that a new thermodynamic cycle can take place within the refrigerant circuit 2.

The second expansion device 21 is in the closed position, which means that the fourth heat exchanger 22 is inoperative.

As for the loop 3 for heat-transfer liquid, the pump 13 is switched off, which means that there is no circulation of heat-transfer liquid in the first portion of the heat-transfer liquid loop between the first heat exchanger 5 and the first heat exchanger 12. By contrast, the circulation means 48 is active and causes the heat-transfer liquid to circulate in the second portion of the heat-transfer liquid loop between the first heat exchanger 5 and the second heat exchanger 35, so as to offload the heat energy into the flow 19 of exterior air.

Figure 7:
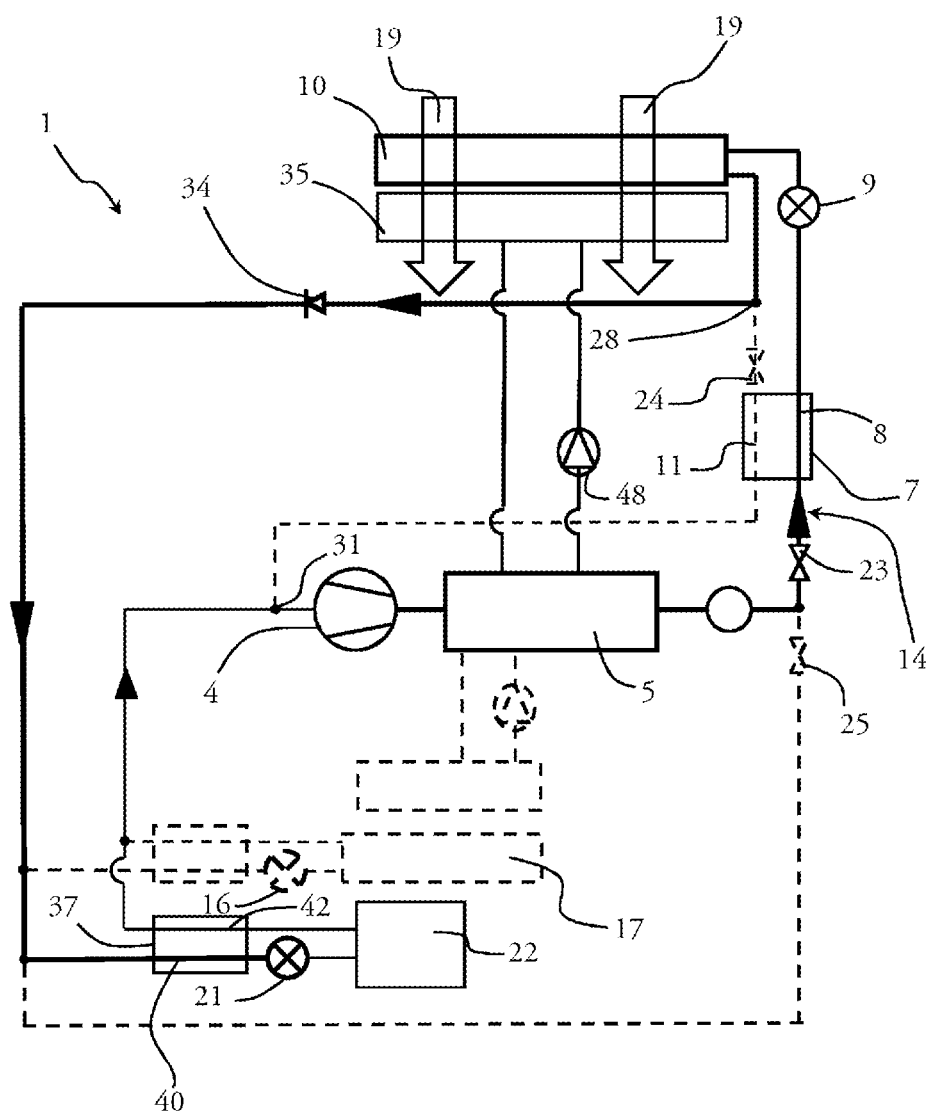

FIG. 7 illustrates a mode of operation corresponding to a cooling of a component of an electric powertrain of the vehicle. Such a component is, for example, an electric motor, an electrical-energy storage device or else a power electronics module.

The behavior of the refrigerant in the main leg 14 is identical to that of FIG. 6, and reference may be made to the description of that figure for a description thereof. This mode of operation differs from that of FIG. 6 in that the first expansion device 16 is placed in a closed position, preventing any circulation of refrigerant in the third heat exchanger 17.

The second leg 20 on the other hand is active, insofar as the fourth heat exchanger 22 is operating as an evaporator. The refrigerant in the liquid state passes through the first pass 40 of the second internal heat exchanger 37 and arrives at the second expansion device 21, in which it experiences expansion. The refrigerant then vaporizes as it passes through the fourth heat exchanger 22, the latter having passing through it an additional liquid which exchanges heat with one or the other of the components of the electric powertrain. This is how the cooling of this component is brought about.

The refrigerant in the gaseous state then leaves the fourth heat exchanger 22 and passes through the second pass 42 of the second internal heat exchanger 37. There is a transfer of heat energy between the refrigerant in the liquid state which is present in the first pass 40 and the refrigerant in the gaseous state which is present in the second pass 42 of the second internal heat exchanger 37. The refrigerant which leaves the second pass 42 of the second internal heat exchanger 37 finally arrives at the inlet of the compression device 4 so that a new thermodynamic cycle can take place within the refrigerant circuit 2.

Figure 8:
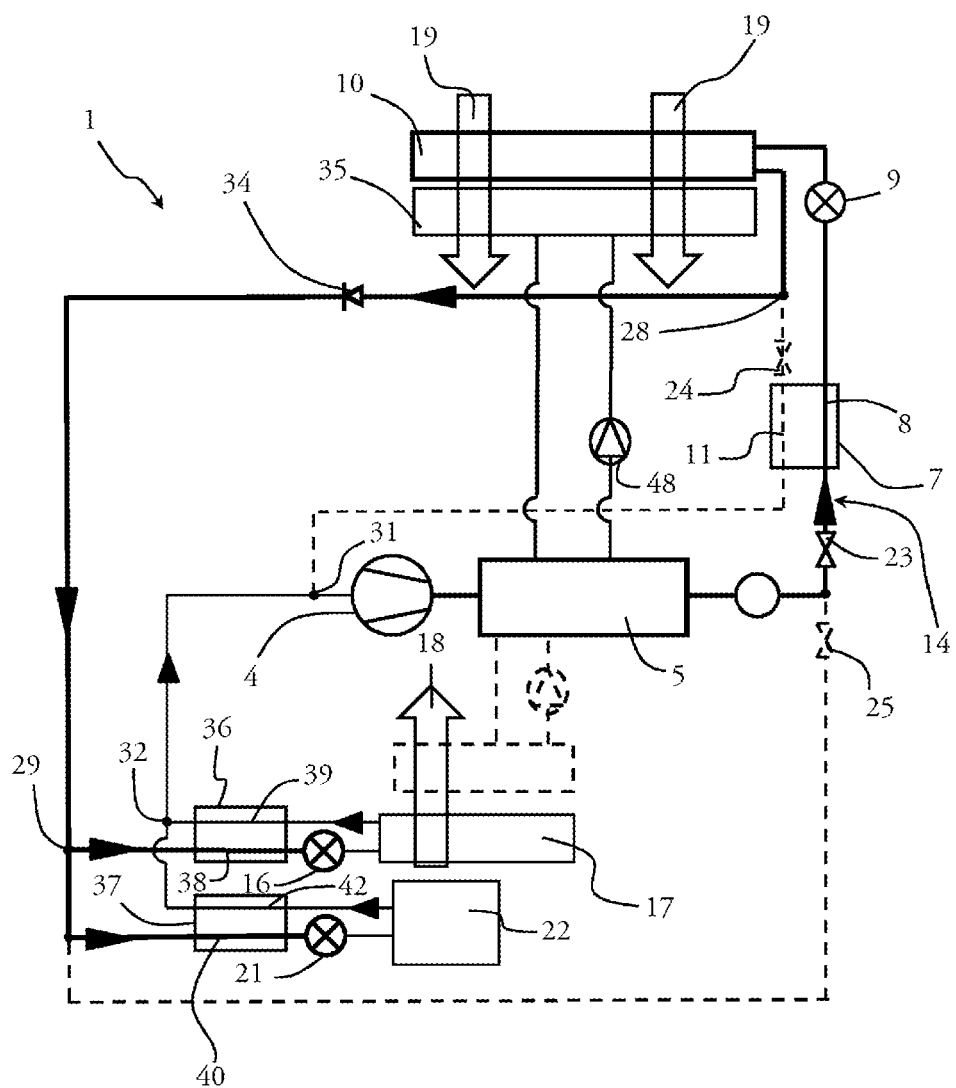

FIG. 8 illustrates a mode of operation corresponding to a combination of the mode of operation of FIG. 6 with the mode of operation of FIG. 7. This mode of operation of FIG. 8 simultaneously performs cooling of the vehicle cabin interior and cooling of a component of the electric powertrain of the vehicle. This situation may arise for example when the vehicle is in a rapid-charging phase, with high exterior temperature conditions.

The behavior of the refrigerant in the main leg 14 is identical to that of FIGS. 6 and 7, and reference may be made to the description of those figures for a description thereof.

In the case of FIG. 8, the first leg 15 and the second leg 20 are active, insofar as the third heat exchanger 17 and the fourth heat exchanger 22 are simultaneously operating as evaporators.

At the second connection point 29, the refrigerant divides and circulates through each of the internal heat exchangers 36, 37. The first expansion device 16 and the second expansion device 21 employ an expansion of the refrigerant, the latter then vaporizing in the third heat exchanger 17 and in the fourth heat exchanger 22.

The mode of operation of FIG. 9 is a mode referred to as "heat pump" in which the refrigerant circuit 2 and the heat-transfer liquid loop 3 combine for the purposes of heating the flow 18 of interior air.

The first heat exchanger 5 offloads the heat energy generated by the compression device 4 into the heat-transfer liquid. The pump 13 is active and the hot heat-transfer liquid can then reach the first heat exchanger 12 and heat the flow 18 of interior air sent into the vehicle cabin interior. The refrigerant is then condensed and its liquid phase is stored in the accumulation device 6. The refrigerant in the liquid state passes through the first pass 8 of the main internal heat exchanger 7 and reaches the expansion member 9.

This expansion member 9 generates an expansion of the refrigerant, which vaporizes as it passes through the second heat exchanger 10 which is used here as an evaporator. On leaving the second heat exchanger 10, the refrigerant passes through the second pass 11 of the main internal heat exchanger 7 and there is a transfer of heat energy between these two passes. The thermal performance of the refrigerant circuit 2 is thus improved in heat-pump mode by the existence of this main internal heat exchanger 7.

The secondary valve 24 is placed in the open position, so that the refrigerant leaving the second pass 11 of the main internal heat exchanger 7 returns to the compression device 4 to perform a new thermodynamic cycle.

The first valve 25, the first expansion device 16 and the second expansion device 21 are placed in a shut-off position, preventing any circulation of the refrigerant through them. The means 48 for circulating the heat-transfer liquid is also switched off, preventing any circulation of the heat-transfer liquid between the first heat exchanger 5 and the second heat exchanger 35.

FIG. 10 illustrates a mode of operation referred to as interior heating mode, in which energy coming from the electric powertrain is used to operate the thermodynamic cycle which takes place within the refrigerant circuit 2. This mode of operation thus makes it possible to heat the flow 18 of interior air.

In order to do this, the first heat exchanger 5 offloads the heat energy generated by the compression device 4 into the heat-transfer liquid. The pump 13 is active and the hot heat-transfer liquid can then reach the first heat exchanger 12 and thus heat the flow 18 of interior air sent into the vehicle cabin interior. The refrigerant is then condensed and its liquid phase is stored in the accumulation device 6.

The main valve 23 is closed, thus blocking any circulation of refrigerant toward the main internal heat exchanger 7. The first valve 25 is in the open position, allowing refrigerant to circulate through the piping 33. The second expansion device 21 is open, and causes the refrigerant to expand. The second leg 20 is thus active, insofar as the fourth heat exchanger 22 is operating as an evaporator. The refrigerant in the liquid state passes through the first pass 40 of the second internal heat exchanger 37 and arrives at the second expansion device 21. The refrigerant then vaporizes as it passes through the fourth heat exchanger 22, the latter having passing through it the additional liquid which exchanges heat with one or the other of the components of the electric powertrain. Thus, heat energy is recovered from the electric powertrain and used to operate the evaporation phase of the thermodynamic cycle.

The secondary valve 24 and the first expansion device 16 are placed in a closed position, preventing any circulation of refrigerant within the first leg 15.

FIG. 11 illustrates a fourth embodiment of the management system 1 according to the invention. Reference may be made to the embodiment illustrated in FIG. 3 for a description of the common components.

The first leg 15 and the second leg 20 each respectively comprise an internal heat exchanger and an expansion device which in this instance takes the form of a controlled-closure thermostatic expansion valve identical to the one described in FIG. 5.

The embodiment of FIG. 11 also differs from the embodiment of FIG. 3 through the presence of a pipe 49, the circulation of the refrigerant through which is placed under the control of a second valve 50. The pipe 49 is connected on one side to a sixth connection point 51 positioned between the main valve 23 and the first valve 25, at the outlet of the accumulation device 6. At the other end, the pipe 49 is connected to a seventh connection point 54 situated between the first connection point 28 and the second connection point 29.

The pipe 49 bypasses part of the main leg 14 which comprises the main internal heat exchanger 7, the expansion member 9 and the second heat exchanger 10. The pipe 49 also comprises a fifth heat exchanger 52 designed to have passing through it the flow 19 of air external to the interior of the vehicle cabin.

According to this fourth embodiment, the flow 19 of exterior air passes successively and in this order through: the fifth heat exchanger 52, the second heat exchanger 35 and the second heat exchanger 10.

This fourth embodiment makes it possible to reduce the drops in pressure head experienced by the refrigerant as it passes through the main internal heat exchanger 7, the expansion member 9 and the second heat exchanger 10.

The first heat exchanger 5 behaves as a condenser. When the second valve 50 is open and at the same time the main valve 23 is closed, the refrigerant continues on its way through the fifth heat exchanger 52, where it undergoes forced supercooling. The refrigerant thus cooled reaches the rest of the refrigerant circuit 2 at the seventh connection point 54.

The thermal management system 1 according to the first embodiment, according to the second embodiment, according to the third embodiment or according to the fourth embodiment may comprise means for acquiring information relating to the refrigerant circuit 2, to the heat-transfer liquid loop 3, to one of the components of the electric powertrain, notably the electrical-energy storage device, or to the vehicle cabin interior, and means for acting on the components of this thermal management system in such a way as to achieve fixed setpoints, notably with regard to the temperatures of the flow 18 of interior air, to the refrigerant, or to the rotational speeds of the compression device 4. This control of the thermal management system 1 may be performed by a control device which may take the form of an electronic unit or box. This control device is advantageously capable of operating the compression device 4, the valves, the expansion member and the expansion devices, the pump and/or the means for circulating the heat-transfer liquid. The control device thus acts on the rotational speed of this compression device, notably when this is a fixed-displacement compressor with inbuilt electric motor.

It will be appreciated from the foregoing that the present invention thus makes it possible in a simple way and at optimized cost to provide thermal management, through heating or cooling, of a component of the electric powertrain, such as a battery or a battery pack, and/or of the interior of the vehicle cabin. The objectives set for the invention are achieved, by making available a thermal management system which, with reduced means, performs a function of heating the vehicle cabin interior, a function of cooling the vehicle cabin interior, a function of recovering energy from a component of the electric powertrain, and a function of providing thermal management of one of the components of the electric powertrain of the vehicle.

The invention is not limited to the means and configurations described and illustrated herein, however, but also extends to all equivalent means or configurations and to any technically functional combination of such means. In particular, the architecture of the refrigerant circuit or of the heat-transfer liquid loop can be modified without detriment to the invention provided that it fulfils the functionalities described in the present document.

The invention claimed is:

1. A thermal management system for a vehicle, comprising:
    a refrigerant circuit; and
    a loop for heat-transfer liquid, the loop for heat-transfer liquid comprising at least one heat exchanger configured to dissipate heat energy into an air flow,
    the refrigerant circuit comprising, in this order and in a direction in which the refrigerant circulates in the refrigerant circuit:
        at least one compression device,
        a first heat exchanger which thermally couples the loop for heat-transfer liquid to the refrigerant circuit,
        a refrigerant accumulation device,
        a first pass of an internal heat exchanger,
        an expansion member,
        a second heat exchanger configured to have passing through it a flow of air external to an interior of the vehicle cabin,
        a second pass of the internal heat exchanger, and
        a main leg and at least a first leg parallel to the main leg, wherein
            the main leg comprises: at least the compression device, the first heat exchanger, the refrigerant accumulation device, the first pass of the internal heat exchanger, the expansion member, the second heat exchanger and the second pass of the internal heat exchanger, and
            the first leg comprises: at least a first expansion device and a third heat exchanger configured to have passing through it an interior air flow sent into the interior of the vehicle cabin, and
            the first leg is connected to the main leg at a first connection point between the second heat exchanger and the internal heat exchanger.

2. The system as claimed in claim 1, wherein the expansion member is configured to adopt at least one position that is inoperative with respect to the refrigerant.

3. The system as claimed in claim 1, wherein the internal heat exchanger of the main leg is a main internal heat exchanger, the first leg comprising a first internal heat exchanger.

4. The system as claimed in claim 1, wherein the heat exchanger of the loop for heat-transfer liquid is a radiator configured to have passing through it the flow of air external to the interior of the vehicle cabin.

5. The system as claimed in claim 1, wherein the heat exchanger of the loop for heat-transfer liquid is a unit heater configured to have passing through it the flow of interior air of the loop for heat-transfer liquid sent into the interior of the vehicle cabin.

6. The system as claimed in claim 1, wherein the refrigerant circuit comprises at least a second leg parallel to the first leg, the second leg comprising a second expansion device and a fourth heat exchanger designed to cool an additional fluid.

7. The system as claimed in claim 6, wherein the expansion member and/or the second expansion device are configured to adopt at least a position that prevents any circulation of refrigerant toward the third heat exchanger or toward the fourth heat exchanger, respectively.

8. The system as claimed in claim 6, wherein the internal heat exchanger of the main leg is a main internal heat exchanger, the refrigerant circuit comprising a secondary internal heat exchanger common to the first leg and to the second leg.

9. The system as claimed in claim 6, wherein the internal heat exchanger of the main leg is a main internal heat exchanger, the second leg comprising a second internal heat exchanger.

10. A thermal management system for a vehicle, comprising:
    a refrigerant circuit comprising a main leg and at least a first leg parallel to the main leg; and
    a loop for heat-transfer liquid, the loop for heat-transfer liquid comprising at least one heat exchanger configured to dissipate heat energy into an air flow,
    the main leg comprising: a compression device, a first heat exchanger, a refrigerant accumulation device, a first pass of the internal heat exchanger, an expansion member, a second heat exchanger and a second pass of the internal heat exchanger,
    the first leg comprising: at least a first expansion device and a third heat exchanger configured to have passing through it an interior air flow sent into the interior of the vehicle cabin,
    wherein the first leg is connected to the main leg at a first connection point between the second heat exchanger and the internal heat exchanger,
    wherein due to an arrangement of the first leg, the second heat exchanger acts as an evaporator in a heat-pump mode in collaboration with the first heat exchanger which itself acts as a condenser, and
    the second heat exchanger also acts as a supercooling heat exchanger, both in a conditioning mode in collaboration with the third heat exchanger and in a battery-cooling mode in collaboration with a fourth heat exchanger.

* * * * *